(12) United States Patent
Hung

(10) Patent No.: US 7,302,596 B2
(45) Date of Patent: Nov. 27, 2007

(54) CIRCUIT CAPABLE OF UPDATING POWER SUPPLY SPECIFICATION OF MICROPROCESSOR AND METHOD THEREOF

(75) Inventor: Wen-Chi Hung, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 475 days.

(21) Appl. No.: 10/895,042

(22) Filed: Jul. 21, 2004

(65) Prior Publication Data
US 2006/0020832 A1    Jan. 26, 2006

(51) Int. Cl.
*G06F 1/00* (2006.01)
(52) U.S. Cl. .................. 713/310; 713/1; 713/300
(58) Field of Classification Search ............ None
See application file for complete search history.

(56) References Cited

U.S. PATENT DOCUMENTS 5,787,297 A * 7/1998 Lin .................... 713/322
7,134,030 B2 * 11/2006 Wang ................. 713/320

* cited by examiner

*Primary Examiner*—Rehana Perveen
*Assistant Examiner*—Anand B. Patel
(74) *Attorney, Agent, or Firm*—Troxell Law Office, PLLC

(57) ABSTRACT

A circuit capable of updating the power supply specification of microprocessor and a method thereof are proposed. The circuit is disposed on a computer motherboard, and makes use of downloaded program data of the power supply specification of a new microprocessor a microprocessor is updated. The circuit uses a programmable memory IC to execute the program data of the power supply specification for automatically updating and modifying the required power supply specification of the microprocessor. Through a PWM control unit, a drive unit and a power switch, the required power supply specification of a new microprocessor can be provided for the microprocessor to perform boot actions.

7 Claims, 4 Drawing Sheets

CIRCUIT CAPABLE OF UPDATING POWER SUPPLY SPECIFICATION OF MICROPROCESSOR AND METHOD THEREOF

FIELD OF THE INVENTION

The present invention relates to a circuit capable of updating the power supply specification of microprocessor and a method thereof and, more particularly, to a circuit and a method thereof used on a computer motherboard and capable of making use of a programmable memory IC to store and execute program data of the power supply specification of a microprocessor for providing the required power for the microprocessor.

BACKGROUND OF THE INVENTION

Due to continual progress of the science and technology, computers have become popular in everyday lives of people. Computers are constantly updated and improved to meet the requirements of software in a general trend towards multimedia. Common clients, however, can't afford the constantly updated computers. Therefore, a user usually replaces the motherboard and the microprocessor in a computer to update a computer and enhance the functions thereof.

As shown in FIG. 1, in a conventional computer motherboard 1, a microprocessor 12 is connected to a pulse width modulation (PWM) control unit 14, and sends a voltage correspondence signal required for work to the PWM control unit 14. After the PWM control unit 14 receives the voltage correspondence signal from the microprocessor 12, it generates a PWM signal corresponding to the voltage required for work of the microprocessor 12 for controlling a drive unit 16 to drive at least a power switch 18 for performing switching actions according to power provided by the motherboard 1, thereby outputting the voltage required for work of the microprocessor 12.

Reference is made to FIG. 1 again. A user usually upgrades a computer with a faster microprocessor 12. The working voltage specification of the new microprocessor 12, however, is generally different from that of the old microprocessor 12. Therefore, when the new microprocessor 12 sends the voltage correspondence signal required for work to the PWM control unit 14, the PWM control unit 14 can't produce a PWM signal corresponding to the voltage required for work of the new microprocessor. The PWM control unit 14 thus can't accurately control the drive unit 16 to drive the power switch 18 for performing switching actions, and hence is not able to output the voltage required for work of the new microprocessor 12.

The new microprocessor 12 is not compatible with the PWM control unit 14 on the original motherboard 1. That is, the PWM control unit 14 on the original motherboard 1 can't provide the working voltage for normal operations of the new microprocessor 12. Therefore, when a user installs a new microprocessor 12, it is usually necessary for him to also install a new computer motherboard 1 to provide the voltage required for work of the new microprocessor 12. In other words, the upgrade is expensive.

SUMMARY OF THE INVENTION

Accordingly, one object of the present invention is to provide a circuit capable of updating the power supply specification of a microprocessor and a method thereof to solve the above-described problem of the original computer motherboard being unable to provide power for a new microprocessor with a different working voltage specification, thus forcing a computer motherboard upgrade along with the desired microprocessor upgrade.

The circuit capable of updating the power supply specification of microprocessor of the present invention makes use of a programmable memory IC connected to a microprocessor to receive a power request signal and a program data signal from the microprocessor. The circuit also executes the program data signal to output a working voltage control signal sent to a PWM control unit connected to the programmable memory IC so that the PWM control unit can output a PWM signal. A drive unit is connected to the PWM control unit and at least a power switch, and receives the PWM signal to drive the power switch for performing switching actions. The power switch provides the required power for the microprocessor through switching actions based on a DC power source provided by the computer motherboard.

The circuit capable of updating the power supply specification of microprocessor of the present invention is used to update microprocessors with the same total pin number. That is, when updating the microprocessor, it is necessary to use a new microprocessor having the same total pin number as the old microprocessor.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
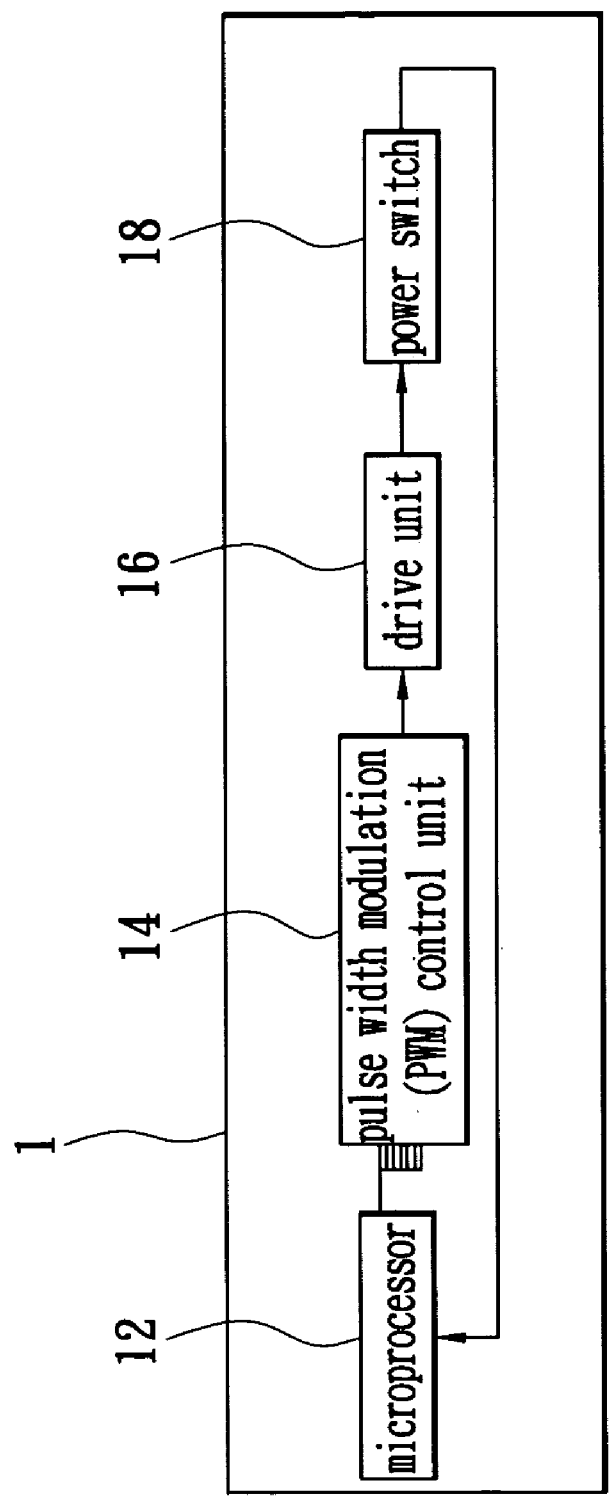
FIG. 1 is a block diagram of a conventional power supply circuit of microprocessor.
Figure 2:
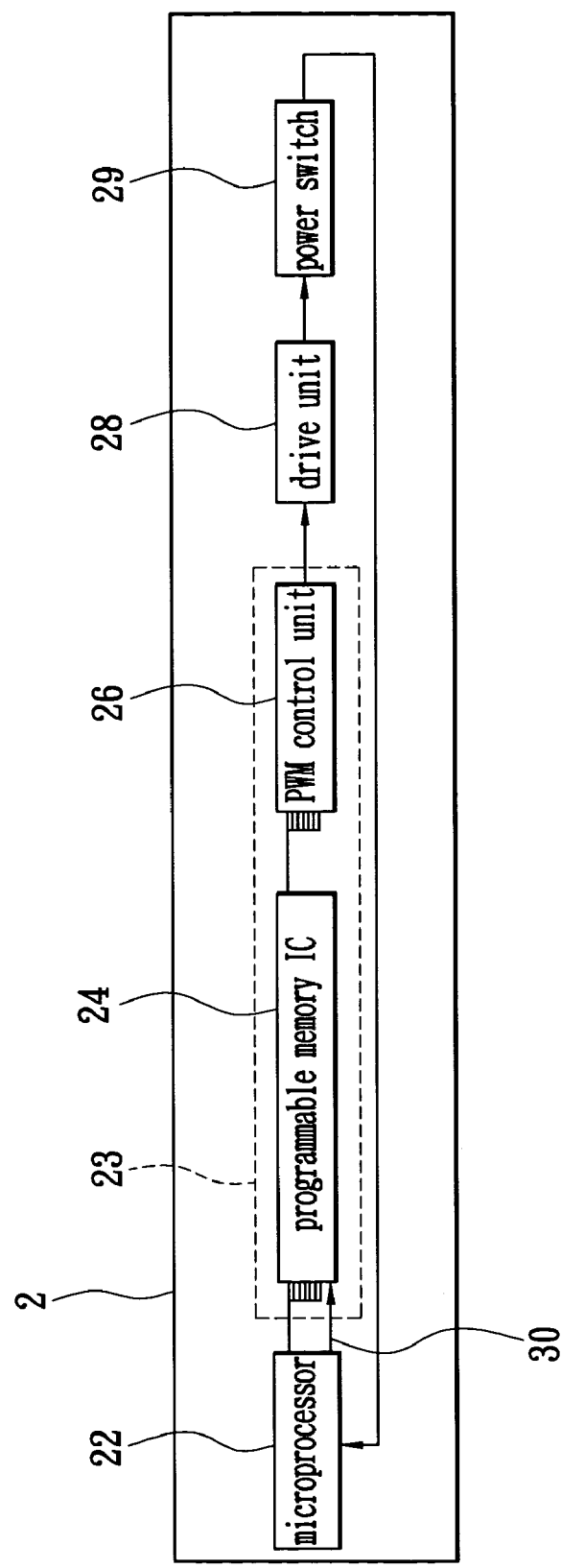
FIG. 2 is a block diagram of a power supply circuit of microprocessor of the present invention.

As shown in FIG. 2, the circuit capable of updating the power supply specification of microprocessor of the present invention is disposed on a computer motherboard (not shown) to solve the prior art problem of the original computer motherboard being unable to provide power for a new microprocessor with a different working voltage specification, thus forcing replacement of the computer motherboard when the microprocessor is upgraded. The circuit comprises a microprocessor 22, a programmable PWM control unit 23, a drive unit 28 and at least a power switch 29. The above programmable PWM control unit 23 is formed by connecting a PWM control unit 26 and a programmable memory IC 24.

Figure 3:
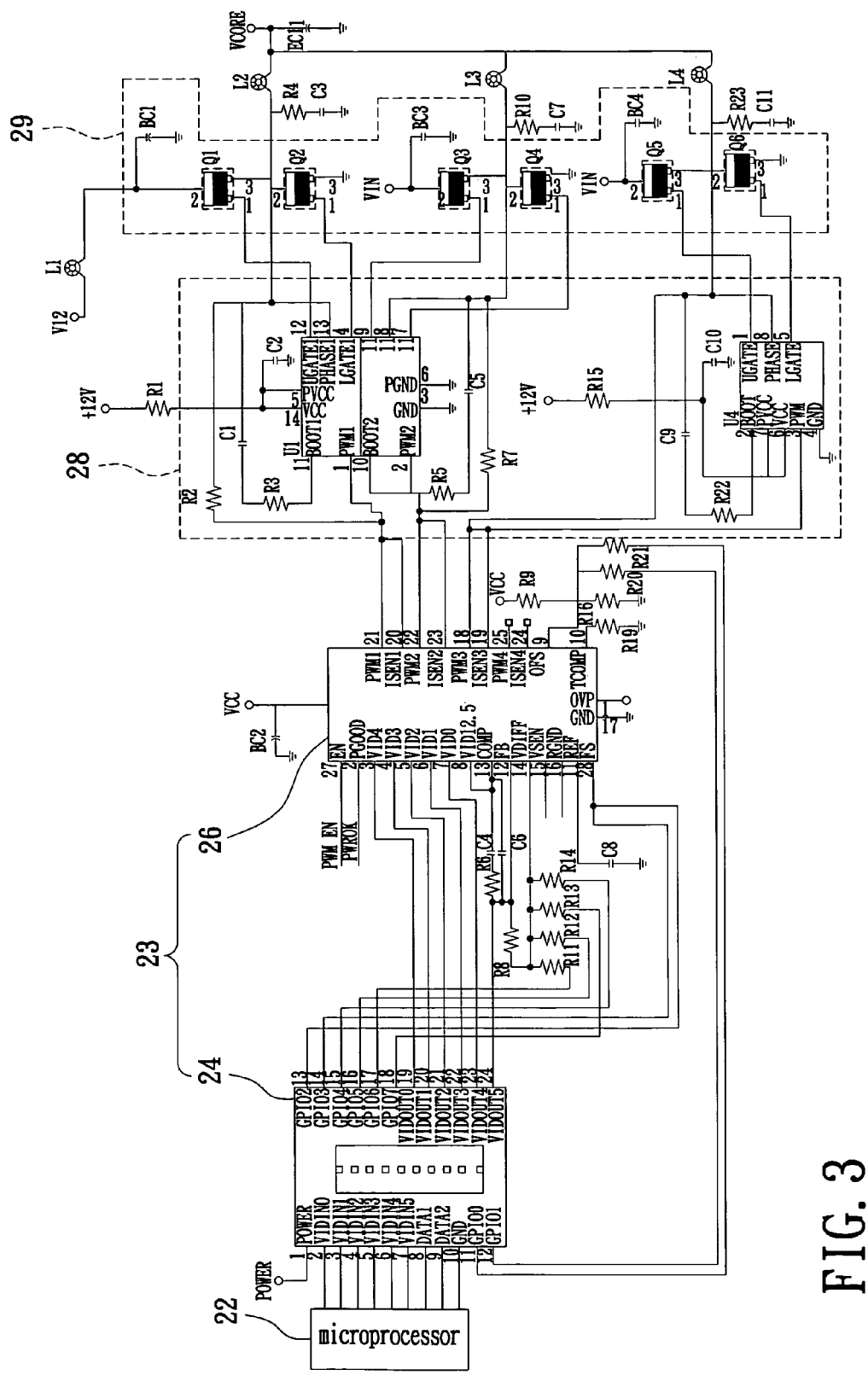
FIG. 3 is a diagram of a power supply circuit of microprocessor of the present invention.

As shown in FIG. 3, the circuit capable of updating the power supply specification of microprocessor of the present invention comprises a microprocessor 22, a programmable memory IC 24, a PWM control unit 26, a drive unit 28 and several power switches 29. The programmable memory IC 24 is connected with the PWM control unit 26 to form the programmable PWM control unit 23.

Reference is made to FIG. 3 as well as FIG. 2. The microprocessor 22 is connected to the programmable memory IC 24, and sends a power request signal to the programmable memory IC 24 and a program data signal to the programmable memory IC 24 via a data bus 30. The programmable memory IC 24 is connected to the PWM control unit 26, executes the program data signal from the microprocessor 22 and outputs a working voltage control signal to the PWM control unit 26 according to the power request signal. The PWM control unit 26 is connected to the drive unit 28, and outputs a PWM signal to the drive unit 28 according to the working voltage control signal. The PWM signal is used to control the drive unit 28 to drive the power switches 29 connected to the drive unit 28 for performing switching actions. These power switches 29 provide the required power for the microprocessor 22 through switching actions based on a DC powers source provided by the computer motherboard (not shown).

Reference is made to FIG. 3 as well as FIG. 2. The program data signal sent to the programmable memory IC 24 from the microprocessor 22 is a program data signal of power supply specification, which can be downloaded from a remote server (not shown) via the Internet, or can be downloaded from an external memory device (not shown).

The power supply specification of the microprocessor 22 needs to match the corresponding program data signal of power supply specification. The program data signal of power supply specification is sent to the programmable memory IC 24 from the microprocessor 22 via the data bus 30. The programmable memory IC 24 is used to perform storage and execution of the program data signal of power supply specification.

Reference is made to FIG. 3 as well as FIG. 2. The above power switches 29 are transistors.

The circuit capable of updating the power supply specification of microprocessor of the present invention is used for microprocessors 22 having the same total pin number for update of microprocessor. That is, when updating a microprocessor, it is necessary to use a new microprocessor 22 having the same total pin number as the old microprocessor 22.

Figure 4:
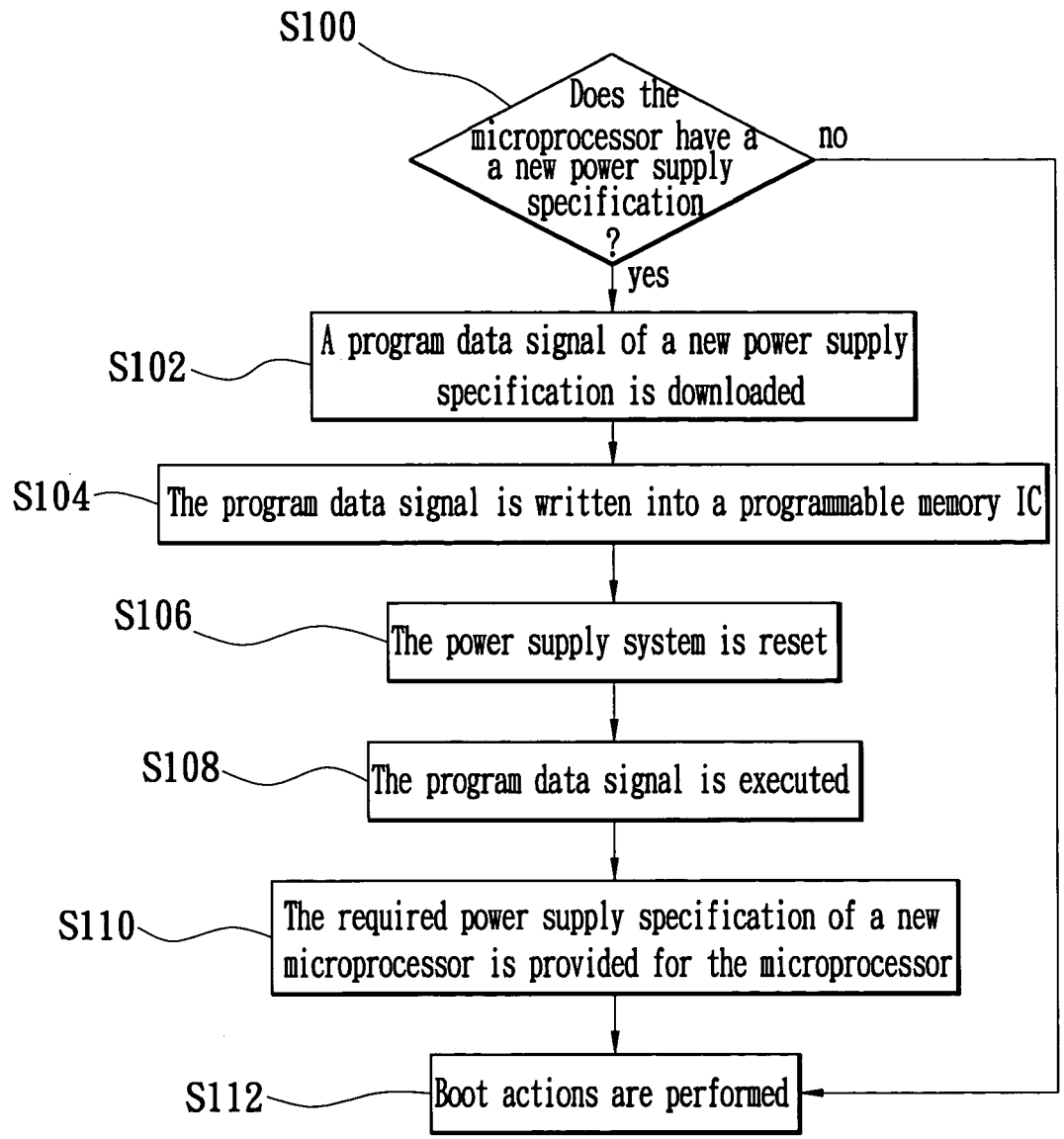
FIG. 4 is a flowchart of updating the power supply specification of microprocessor of the present invention.

Reference is made to FIG. 4 as well as FIG. 2. The method capable of updating the power supply specification of microprocessor of the present invention comprises the following steps: detecting a microprocessor and determining whether the power supply specification of the microprocessor is a new one (Step S100); downloading a program data signal of the new power supply specification of microprocessor (Step S102); writing the program data signal into a programmable memory IC via a data bus by the microprocessor (Step S104); resetting a power supply system (Step S106); executing the program data signal through the programmable memory IC (Step S108); providing the new power supply specification of microprocessor to the microprocessor (Step S110); and performing booting actions (Step S112).

Reference is made to FIG. 4 as well as FIG. 2. In the above illustration, booting actions are directly performed (Step S112) if the power supply specification of the microprocessor is not a new one in the step of detecting a microprocessor and determining whether the power supply specification of the microprocessor is a new one (Step S100). The program data signal can be obtained by downward from a remote server via the Internet, or the program data signal can be obtained by downward from an external memory device in the step of downloading a program data signal of the new power supply specification of microprocessor (Step S102).

Reference is made to FIG. 4 as well as FIG. 2. When a user replaces a new microprocessor 22, a power supply system on the computer motherboard (not shown) detects the required power supply specification of the new microprocessor 22, and downloads a corresponding program data signal of power supply specification according to the power supply specification. At the same time, the microprocessor 22 sends the program data signal of power supply specification to the programmable memory IC 24 via the data bus 30, and resets the power supply system on the computer motherboard (not shown). After the power supply system is reset, the programmable memory IC 24 will execute the stored program data signal of power supply specification to provide the required power supply specification for the new microprocessor 22 via the PWM control unit 26, the drive unit 28 and the power switches 29 to perform boot actions.

To sum up, the circuit and method capable of updating the power supply specification of microprocessor of the present invention can solve the prior art problem of the original computer motherboard being unable to provide power for a new microprocessor with a different working voltage specification, thereby forcing an upgrade of the computer motherboard when the microprocessor is updated. Moreover, a computer upgrade can be accomplished through circuit design or component replacement of other peripherals, hence saving a lot of money. The circuit capable of updating the power supply specification of microprocessor of the present invention makes use of a programmable memory IC to solve the above problem. It is only necessary for a user to download a corresponding program data signal of power supply specification of a new microprocessor. The programmable memory IC will then execute the program data signal of power supply specification to automatically update the required power supply specification of the microprocessor.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A circuit for updating a power supply specification of a microprocessor and disposed on a computer motherboard, said circuit comprising:
   a microprocessor for outputting a power request signal and a program data signal, wherein said program data signal is a program data signal of the power supply specification of said microprocessor;
   a programmable memory IC connected to said microprocessor for receiving said power request signal and said program data signal and executing said program data signal to output a working voltage control signal;
   a PWM control unit connected to said programmable memory IC for receiving said working voltage control signal to output a PWM signal; and
   a drive unit connected to said PWM control unit and at least a power switch for receiving said PWM signal to drive said power switch to perform switching actions and provide a required power for said microprocessor via said power switch.

2. The circuit for updating the power supply specification of microprocessor as claimed in claim 1, wherein said program data signal of the power supply specification is downloaded from a remote server via the Internet.

3. The circuit for updating the power supply specification of microprocessor as claimed in claim 1, wherein said program data signal of the power supply specification is downloaded from an external memory device.

4. The circuit for updating the power supply specification of microprocessor as claimed in claim 1, wherein said power switch is a transistor.

5. A circuit for updating the power supply specification of microprocessor, said circuit being disposed on a computer motherboard, said circuit comprising:
- a microprocessor for outputting a power request signal and a program data signal, wherein said program data signal is a program data signal of the power supply specification of said microprocessor;
- a programmable PWM control unit connected to said microprocessor for receiving said power request signal and said program data signal and executing said program data signal to output a working voltage control signal, said programmable PWM control unit also outputting a PWM signal based on said working voltage control signal; and
- a drive unit connected to said programmable PWM control unit and at least a power switch for receiving said PWM signal to drive said power switch to perform switching actions and provide a required power for said microprocessor via said power switch.

6. A method of updating the power supply specification of microprocessor, comprising the steps of:
- detecting a microprocessor and determining whether the power supply specification of said microprocessor is a new one;
- performing booting actions directly, when the power supply specification of said microprocessor is not a new one;
- downloading program data of the new power supply specification of microprocessor from a remote server via an internet;
- writing said program data into a programmable memory IC;
- resetting a power supply system;
- executing said program data through said programmable memory IC;
- providing a new power supply specification of microprocessor to said microprocessor; and
- performing booting actions.

7. A method of updating the power supply specification of microprocessor, comprising the steps of:
- detecting a microprocessor and determining whether the power supply specification of said microprocessor is a new one;
- performing booting actions directly, when the power supply specification of said microprocessor is not a new one;
- downloading program data of the new power supply specification of microprocessor from an external memory device;
- writing said program data into a programmable memory IC;
- resetting a power supply system;
- executing said program data through said programmable memory IC;
- providing a new power supply specification of microprocessor to said microprocessor; and
- performing booting actions.

* * * * *